(12) United States Patent
Bishop

(10) Patent No.: US 9,288,333 B2
(45) Date of Patent: Mar. 15, 2016

(54) VOICE PORT UTILIZATION MONITOR

(75) Inventor: David Bishop, Woodstock, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1633 days.

(21) Appl. No.: 12/325,603

(22) Filed: Dec. 1, 2008

(65) Prior Publication Data

US 2010/0135277 A1 Jun. 3, 2010

(51) Int. Cl.
| | |
|---|---|
| *G06F 15/173* | (2006.01) |
| *H04M 7/00* | (2006.01) |
| *G06F 11/30* | (2006.01) |
| *H04L 12/24* | (2006.01) |
| *H04L 12/26* | (2006.01) |
| *G06F 11/00* | (2006.01) |
| *H04M 3/493* | (2006.01) |

(52) U.S. Cl.
CPC .......... *H04M 7/0084* (2013.01); *G06F 11/30* (2013.01); *H04L 41/0803* (2013.01); *H04L 43/0876* (2013.01); *G06F 11/008* (2013.01); *H04L 41/0856* (2013.01); *H04L 41/22* (2013.01); *H04M 3/493* (2013.01); *H04M 2203/1041* (2013.01)

(58) Field of Classification Search
CPC ............. H04M 3/493–3/4938; G06F 11/008; G06F 11/30–11/3495
USPC ............................... 709/223–226; 379/88.17
See application file for complete search history.

(56) References Cited

U.S. PATENT DOCUMENTS

| | | | | |
|---|---|---|---|---|
| 5,299,260 | A * | 3/1994 | Shaio .................... | 379/266.07 |
| 5,978,465 | A * | 11/1999 | Corduroy et al. ........ | 379/265.02 |
| 6,366,879 | B1 * | 4/2002 | Coxhead et al. ........... | 704/201 |
| 6,477,572 | B1 * | 11/2002 | Elderton et al. ........... | 709/224 |
| 6,831,966 | B1 * | 12/2004 | Tegan .................... | H04M 3/493 370/352 |
| 6,973,415 | B1 * | 12/2005 | Saghier et al. .............. | 702/186 |
| 6,981,035 | B1 * | 12/2005 | Goldberg et al. ........... | 709/223 |
| 7,082,381 | B1 * | 7/2006 | Saghier et al. ............. | 702/182 |
| 7,506,074 | B2 * | 3/2009 | Venkatanarayan et al. ... | 709/250 |
| 7,693,268 | B2 * | 4/2010 | Rossi et al. ............. | 379/112.06 |
| 7,774,444 | B1 * | 8/2010 | George et al. ............. | 709/223 |
| 7,784,054 | B2 * | 8/2010 | Monasterio ................ | 718/105 |
| 7,886,031 | B1 * | 2/2011 | Taylor et al. ............... | 709/221 |
| 7,890,473 | B1 * | 2/2011 | Wyett et al. ............... | 707/688 |
| 7,953,603 | B2 * | 5/2011 | De Armas et al. ......... | 704/270.1 |
| 8,056,082 | B2 * | 11/2011 | Koretz et al. .............. | 718/104 |
| 8,315,245 | B2 * | 11/2012 | Savoor et al. .............. | 370/352 |
| 8,606,894 | B1 * | 12/2013 | Fremont et al. ............. | 709/223 |
| 2001/0046278 | A1 * | 11/2001 | Campbell et al. ........... | 379/67.1 |
| 2003/0005112 | A1 * | 1/2003 | Krautkremer ............... | 709/224 |

(Continued)

OTHER PUBLICATIONS

AMDOCS (Israel) Limited v. Openet Telecom, Inc., No. 1: 10cv910 (LMB/TRJ) (E.D. Va. Oct. 24, 2014).*

(Continued)

*Primary Examiner* — Emmanuel L Moise
*Assistant Examiner* — Julian Chang
(74) *Attorney, Agent, or Firm* — Greenblum & Bernstein, P.L.C.

(57) ABSTRACT

A method for monitoring utilization of a voice over internet protocol platform in a mass calling application includes receiving calls via voice ports established by servers. Utilization information for each of the servers is aggregated in accordance with applications associated with the calls. The aggregated utilization information is separately displayed for each of the applications, each of the applications corresponding to a distinct subset of the calls.

19 Claims, 5 Drawing Sheets

| TOTAL FOR ALL DATA CENTERS: # OF AVAILABLE PORTS - 53150 # OF PORTS IN USE - 15543 % OF PORTS USED – 29.2 | | | | |
|---|---|---|---|---|
| SITE 1 | | SITE 2 | SITE 3 | |
| GROUP A | GROUP B | GROUP A | GROUP A | GROUP B |
| SERVER 1 SERVER 2 | SERVER 3 SERVER 4 SERVER 5 | SERVER 6 SEVER 7 | SERVER 8 SERVER 9 | SERVER10 |
| 1100  1200 | 11000  12000  15000 | 400  1200 | 5000  6000 | 250 |
| NUMBER OF AVAILABLE PORTS | NUMBER OF AVAILABLE PORTS | NUMBER OF AVAILABLE PORTS | NUMBER OF AVAILABLE PORTS | NUMBER OF AVAILABLE PORTS |
| 110  120 | 1490  2030  789 | 326  568 | 4200  5800 | 110 |
| NUMBER OF PORTS IN USE | NUMBER OF PORTS IN USE | NUMBER OF PORTS IN USE | NUMBER OF PORTS IN USE | NUMBER OF PORTS IN USE |
| 10  16.7 | 13.5  16.9  5.3 | 81.5  47.3 | 84  96.7 | 44 |
| % OF PORTS USED | % OF PORTS USED | % OF PORTS USED | % OF PORTS USED | % OF PORTS USED |

(56) References Cited

U.S. PATENT DOCUMENTS

| | | | |
|---|---|---|---|
| 2003/0046396 A1* | 3/2003 | Richter et al. | 709/226 |
| 2003/0079160 A1* | 4/2003 | McGee et al. | 714/39 |
| 2003/0091025 A1* | 5/2003 | Celi et al. | 370/352 |
| 2003/0110007 A1* | 6/2003 | McGee et al. | 702/179 |
| 2003/0131093 A1* | 7/2003 | Aschen et al. | 709/224 |
| 2004/0133772 A1* | 7/2004 | Render | 713/150 |
| 2004/0215768 A1* | 10/2004 | Oulu et al. | 709/224 |
| 2005/0044221 A1* | 2/2005 | Venkatanarayan et al. | 709/225 |
| 2005/0096949 A1* | 5/2005 | Aiber et al. | 705/7 |
| 2005/0149940 A1* | 7/2005 | Calinescu et al. | 718/104 |
| 2006/0277206 A1* | 12/2006 | Bailey et al. | 707/102 |
| 2007/0230681 A1* | 10/2007 | Boyer et al. | 379/265.1 |
| 2008/0046585 A1* | 2/2008 | Blumofe | 709/231 |
| 2008/0120688 A1* | 5/2008 | Qiu | G06F 21/552 726/1 |
| 2008/0155087 A1* | 6/2008 | Blouin | H04L 43/0817 709/223 |
| 2008/0273676 A1* | 11/2008 | Cafarella et al. | 379/93.01 |
| 2008/0282254 A1* | 11/2008 | Blander et al. | 718/105 |
| 2009/0080639 A1* | 3/2009 | Daye et al. | 379/265.01 |
| 2009/0106756 A1* | 4/2009 | Feng et al. | 718/100 |
| 2009/0177484 A1* | 7/2009 | Davis et al. | 705/1 |
| 2009/0276771 A1* | 11/2009 | Nickolov et al. | 717/177 |
| 2010/0023919 A1* | 1/2010 | Chaar et al. | 717/101 |
| 2010/0058349 A1* | 3/2010 | Diwakar et al. | 718/104 |
| 2010/0091761 A1* | 4/2010 | Arnaud | 370/352 |
| 2010/0107172 A1* | 4/2010 | Calinescu et al. | 718/104 |
| 2010/0121744 A1* | 5/2010 | Belz | H04M 15/00 705/30 |
| 2010/0248759 A1* | 9/2010 | Bettis et al. | 455/466 |
| 2011/0129073 A1* | 6/2011 | Chaudhuri et al. | 379/88.16 |

OTHER PUBLICATIONS

"Mass Calling Phone Systems and Mass Phone Calling Services", [Online], retrieved from the Internet at call-center-tech.com/mass-calling.htm on Nov. 11, 2008.

"a2 Knowledgebase: What is a port?", [Online], retrieved from the Internet at emsisoft.com/en/en/kb/articles/tec021110/ on Nov. 17, 2008.

"Mass Call-Polystar", [Online], retrieved from the Internet at polystar.com/OSIX-system/OSIX-system/Products/OSIX-monitoring-applications/Mass-Call/ on Nov. 11, 2008.

* cited by examiner

| TOTAL FOR ALL DATA CENTERS: | # OF AVAILABLE PORTS – 53150 |
| --- | --- |
| | # OF PORTS IN USE – 15543 |
| | % OF PORTS USED – 29.2 |

| SITE 1 | | | | SITE 2 | | SITE 3 | |
| --- | --- | --- | --- | --- | --- | --- | --- |
| GROUP A | | GROUP B | | GROUP A | | GROUP B | |
| SERVER 1 | SERVER 2 | SERVER 3 | SERVER 4 | SERVER 5 | SERVER 6 | SERVER 7 | SERVER 8 | SERVER 9 | SERVER 10 |
| 1100 | 1200 | 11000 | 12000 | 15000 | 400 | 1200 | 5000 | 6000 | 250 |
| NUMBER OF AVAILABLE PORTS | | NUMBER OF AVAILABLE PORTS | | | NUMBER OF AVAILABLE PORTS | | NUMBER OF AVAILABLE PORTS | | NUMBER OF AVAILABLE PORTS |
| 110 | 120 | 1490 | 2030 | 789 | 326 | 568 | 4200 | 5800 | 110 |
| NUMBER OF PORTS IN USE | | NUMBER OF PORTS IN USE | | | NUMBER OF PORTS IN USE | | NUMBER OF PORTS IN USE | | NUMBER OF PORTS IN USE |
| 10 | 16.7 | 13.5 | 16.9 | 5.3 | 81.5 | 47.3 | 84 | 96.7 | 44 |
| % OF PORTS USED | | % OF PORTS USED | | | % OF PORTS USED | | % OF PORTS USED | | % OF PORTS USED |

FIGURE 4A

| | SERVER 1 | SERVER 2 | SERVER 3 | SERVER 4 | SERVER 5 | SERVER 6 | SERVER 7 | SERVER 8 | SERVER 9 | SERVER 10 |
|---|---|---|---|---|---|---|---|---|---|---|
| APP1 | 300 | 400 | 3000 | 4000 | 5000 | 300 | 400 | 1000 | 400 | 50 |
| APP2 | 400 | 250 | 2600 | 2500 | 7500 | 400 | 250 | 1000 | 1600 | 50 |
| APP 3 | 100 | 250 | 1400 | 2500 | 500 | 100 | 250 | 1000 | 1000 | 100 |
| APPN | 300 | 300 | 4000 | 3000 | 2000 | 300 | 300 | 2000 | 3000 | 50 |
| | NUMBER OF AVAILABLE PORTS | | | | | NUMBER OF AVAILABLE PORTS | | NUMBER OF AVAILABLE PORTS | | AVAILABLE PORTS |
| APP 1 | 30 | 40 | 400 | 230 | 89 | 300 | 400 | 1000 | 400 | 50 |
| APP2 | 40 | 15 | 90 | 1000 | 600 | 13 | 130 | 700 | 1400 | 50 |
| APP 3 | 10 | 60 | 500 | 250 | 50 | 3 | 38 | 1000 | 1000 | 5 |
| APPN | 30 | 5 | 500 | 350 | 50 | 10 | 0 | 1500 | 3000 | 5 |
| | NUMBER OF PORTS IN USE | | | | | NUMBER OF PORTS IN USE | | NUMBER OF PORTS IN USE | | NUMBER OF PORTS IN USE |
| APP 1 | 10 | 10 | 13.3 | 5.8 | 1.8 | 100 | 100 | 100 | 100 | 100 |
| APP 2 | 10 | 6 | 3.4 | 40 | 8 | 3.2 | 52 | 70 | 87.5 | 100 |
| APP 3 | 10 | 24 | 35.7 | 10 | 10 | 3 | 15.2 | 100 | 100 | 5 |
| APPN | 10 | 1.7 | 12.5 | 11.7 | 2.5 | 3.3 | 0 | 75 | 100 | 10 |
| | % OF PORTS USED | | % OF PORTS USED | | | % OF PORTS USED | | % OF PORTS USED | | % PORTS USED |

FIGURE 4B

VOICE PORT UTILIZATION MONITOR

BACKGROUND

1. Field of the Disclosure

The present disclosure relates to mass calling applications. More particularly, the present disclosure relates to utilization of a voice over internet protocol platform servicing mass calling applications.

2. Background Information

In a mass calling system, call processing commences with a caller at a public switched telephone network location dialing a telephone number. A local exchange carrier queries a database to determine which telecommunications carrier should handle the call. The database returns a carrier identification code and a routing number. In some cases, the routing number is a dialed toll-free number. In these cases, the local exchange carrier routes the call to a switch. The switch provides telephone messages to thousands of callers that access the switch. For example, a mass calling application for which a switch may be employed includes a tele-voting application.

BRIEF DESCRIPTION OF THE DRAWINGS

FIG. 4A illustrates an exemplary display of voice port utilization in a voice over internet protocol platform, according to an aspect of the present disclosure; and FIG. 4B illustrates an exemplary display of voice port utilization by application in a voice over internet protocol platform, according to an aspect of the present disclosure.

DETAILED DESCRIPTION

Figure 1:
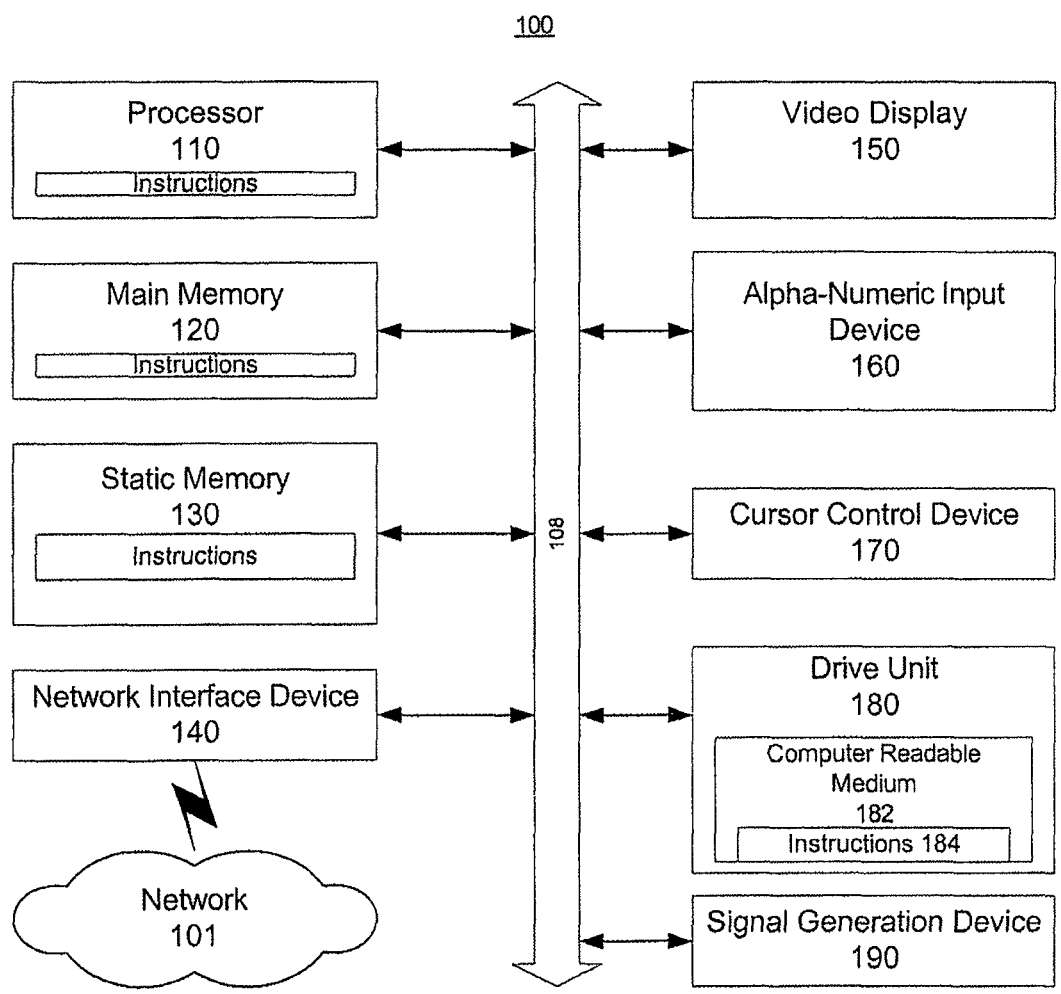
FIG. 1 shows an exemplary general computer system that includes a set of instructions for a voice port utilization monitor.

In view of the foregoing, the present disclosure, through one or more of its various aspects, embodiments and/or specific features or sub-components, is thus intended to bring out one or more of the advantages as specifically noted below.

According to one aspect of the present disclosure, a method for monitoring utilization of a voice over internet protocol platform in a mass calling application includes receiving calls via voice ports established by servers. The method includes aggregating utilization information for each of the servers and each of the sites in accordance with applications associated with the calls. The method includes separately displaying the aggregated utilization information for each of the applications, each of the applications corresponding to a distinct subset of the calls.

According to another aspect of the present disclosure, a display of the aggregated utilization information is updated in real-time.

According to yet another aspect of the present disclosure, the utilization information for one of the servers is calculated based on a number of voice ports handling calls.

According to still another aspect of the present disclosure, the utilization information is determined by polling each of the servers at predetermined intervals.

According to one aspect of the present disclosure, the utilization information is obtained when an alarm is raised by one of the servers.

According to another aspect of the present disclosure, the display is displayed on a mobile device.

According to yet another aspect of the present disclosure, a notification is sent to a device via a text message, a webpage, an email or an automated telephone call, when the utilization information reaches a predetermined threshold.

According to still another aspect of the present disclosure, the predetermined threshold is distinct for each of the applications.

According to one aspect of the present disclosure, the predetermined threshold is customizable for each of the applications.

According one aspect of the present disclosure, a system for monitoring utilization of a voice over internet protocol platform in a mass calling application includes servers operable to receive calls via voice ports established by each of the servers. The system includes an aggregator operable to aggregate utilization information for each of the servers in accordance with applications associated with the calls. The system includes an outputter operable to display the aggregated utilization information for each of the applications, each of the applications corresponding to a distinct subset of the calls.

According to another aspect of the present disclosure, the servers are located geographically distinct sites.

According to yet another aspect of the present disclosure, a display displays the aggregated utilization information for each of the geographically distinct sites.

According to still another aspect of the present disclosure, the geographically distinct sites are load-balanced based on the aggregated utilization information for each of the geographically distinct sites.

According to one aspect of the present disclosure, calls are rerouted based on the aggregated utilization information for at least one of the servers.

According to one aspect of the present disclosure, a tangible computer readable medium storing a computer program, recorded on the computer readable medium, for monitoring utilization of a voice over internet protocol platform in a mass calling application includes a receiving code, recorded on the tangible computer readable medium, executable to receive calls via voice ports established by each of a number of servers. The tangible computer readable medium includes an aggregating code, recorded on the tangible computer readable medium, executable to aggregate utilization information for each of the servers in accordance with applications associated with the calls. The tangible computer readable medium includes an output code, recorded on the tangible computer readable medium, executable to display the aggregated utilization information for each of the applications, each of the applications corresponding to a distinct subset of the calls.

According to another aspect of the present disclosure, a display of the aggregated utilization information searchable using a query tool.

According to yet another aspect of the present disclosure, parameters comprising at least one of: server identification, site identification and group identification are provided to the query tool to obtain utilization information for a subset of the servers.

According to still another aspect of the present disclosure, a user of the display inputs parameters to the query tool to obtain a filtered result.

FIG. 1 is an illustrative embodiment of a general computer system, on which a method to provide voice over internet protocol port utilization monitoring can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Operations administration and maintenance tools are used to monitor, detect, and diagnose issues with voice over internet protocol ports. The operations administration and maintenance tools run on a data collections gateway. In order to remove mass calling applications from traditional and unsupported switching devices, mass calling applications are handled by a voice over internet protocol platform. When a server in the voice over internet protocol platform becomes inoperative, callers experience an impact to their calls. Accordingly, operations administration and maintenance tools allow an administrator to determine a utilization of voice over internet protocol ports in the voice over internet protocol platform.

Legacy long-distance services are replicated in a voice over internet protocol platform environment by supporting the de-loading of switches and edge switches. Accordingly, a replacement solution for the toll-improved service announcements and information collection (ISAIC) platform is provided. The ISAIC platform is a component of a time division multiplex network and supports interactive voice response functionality for playing announcements and collecting input from callers. These capabilities are used to support customers of various legacy long-distance services, including, but not limited to: positive call processing, a software defined network, an AT&T network connection, toll-free services, and custom mass calling event applications. The ISAIC platform also provides announcement provisioning and management capabilities. These announcement provisioning and management capabilities enable the advanced features services center to provision and manage announcements and ancillary data associated with the announcements (e.g. announcement text, announcement identifier) on behalf of long-distance customers. Announcement provisioning capabilities also enable customers to call an "8yy" number to record announcements in real-time. The ISAIC platform is transparent to long-distance customers.

Figure 2:
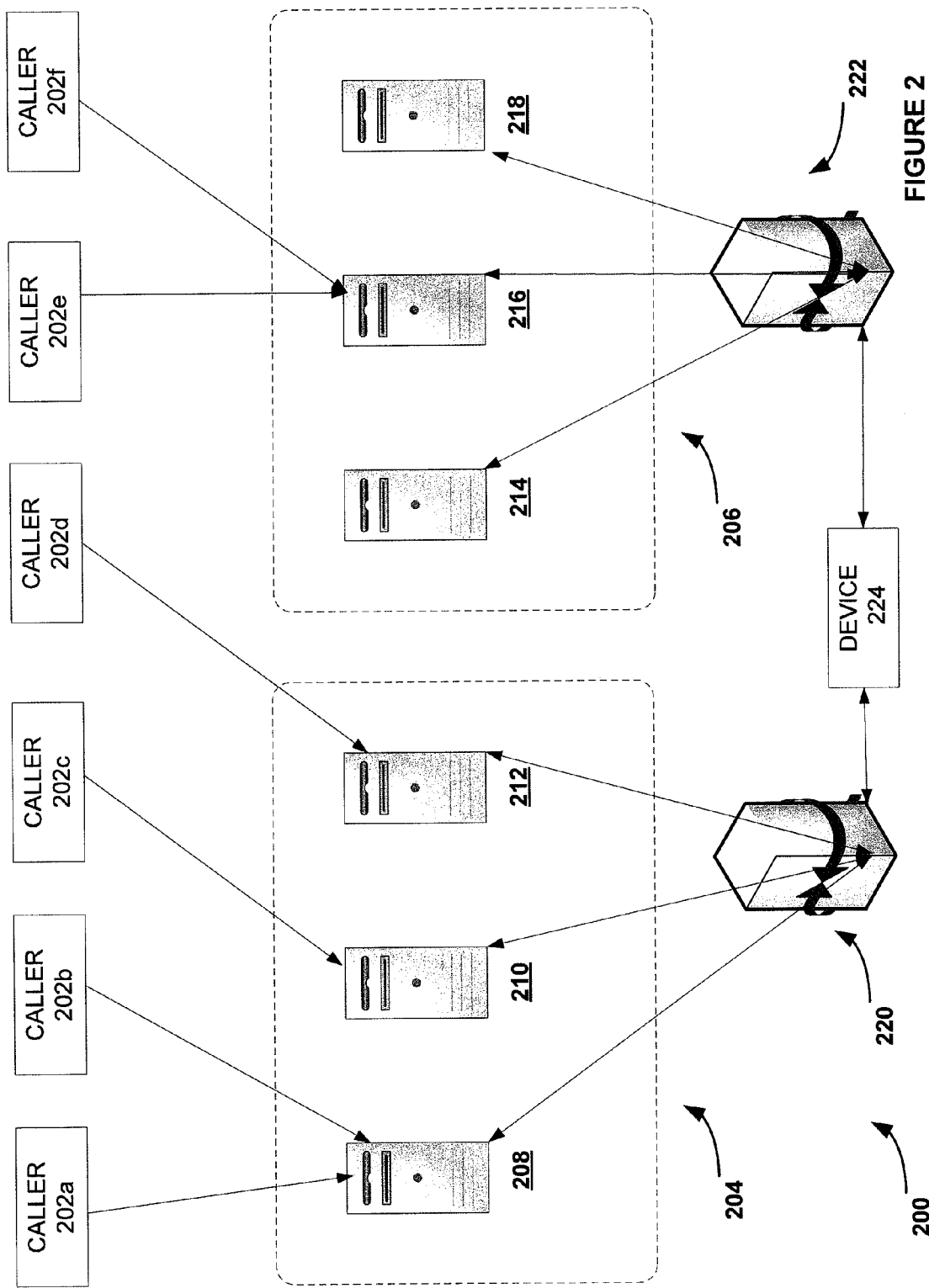
FIG. 2 illustrates a system diagram of the hardware architecture for a voice port utilization monitor, according to an aspect of the present disclosure.

In FIG. 2, voice over internet protocol platform 200 receives calls from a number of callers 202a, 202b, 202c, 202d, 202e, 202f at load-balanced sites 204, 206 at geographically distributed locations. Each of the load-balanced sites 204, 206 has a number of servers 208, 210, 212, 214, 216 and 218 that receive calls over the Internet at an application layer port. Caller 202a and caller 202b are each serviced by server 208 at load-balanced site 204. Caller 202c is serviced by server 210 at load-balanced site 204. Caller 202d is serviced by server 212 at load-balanced site 204. Caller 202e and caller 202*f* are serviced by server 216 at load-balanced site 206. Each received call is handled by a single voice over internet protocol port established by a server processing the call. A utilization tool at gateway servers 220, 222 obtain a metrics file from each server 208, 210, 212, 214, 216 and 218 at predetermined intervals. Alternatively, data from a metrics file for a particular server is transferred to the gateway servers 220, 222 when an alarm is generated. For example, the utilization tool may display utilization for a particular server when an alarm is generated that indicates that over 70% of the voice over internet protocol ports are being utilized on the server. In one embodiment, an alarm is customizable by a client application. Metrics files obtained by gateway servers 220, 222 are parsed by the utilization tool. In an exemplary embodiment, the utilization tool displays the obtained information at a device 224 separate from the gateway servers 220, 222.

A port may be a logical communication channel enabling communication between devices in at least one network. A recipient end point of the communication channel determines which application is to receive the data transmitted by a transmitting endpoint by using a port number contained in a received data packet. Ports are numbered 0 to 65535. Ports numbered 0 to 1023 are termed well-known ports as each port is reserved for known services such as file transfer protocol (e.g., port 21), simple mail transfer protocol (e.g., port 25), hypertext transfer protocol (e.g., port 80), and post office protocol 3 (e.g., port 110). Ports numbered 1024 to 49151 are termed registered ports, meaning they are registered for services, and ports numbered 49152 to 65536 are termed dynamic or private ports, which are used as required. A voice over internet protocol port or a voice port is a port by which voice over internet protocol application data (e.g., a voice call or speech signals) are received by a server in the voice over internet protocol platform. A port may also be a hardware interface by which a device is connected to other devices. More particularly, a port may be an outlet on a device to which a plug, electrical connector, or cable is connected. A signal or signals may be transferred from the device via the port to the connected connector.

Figure 3:
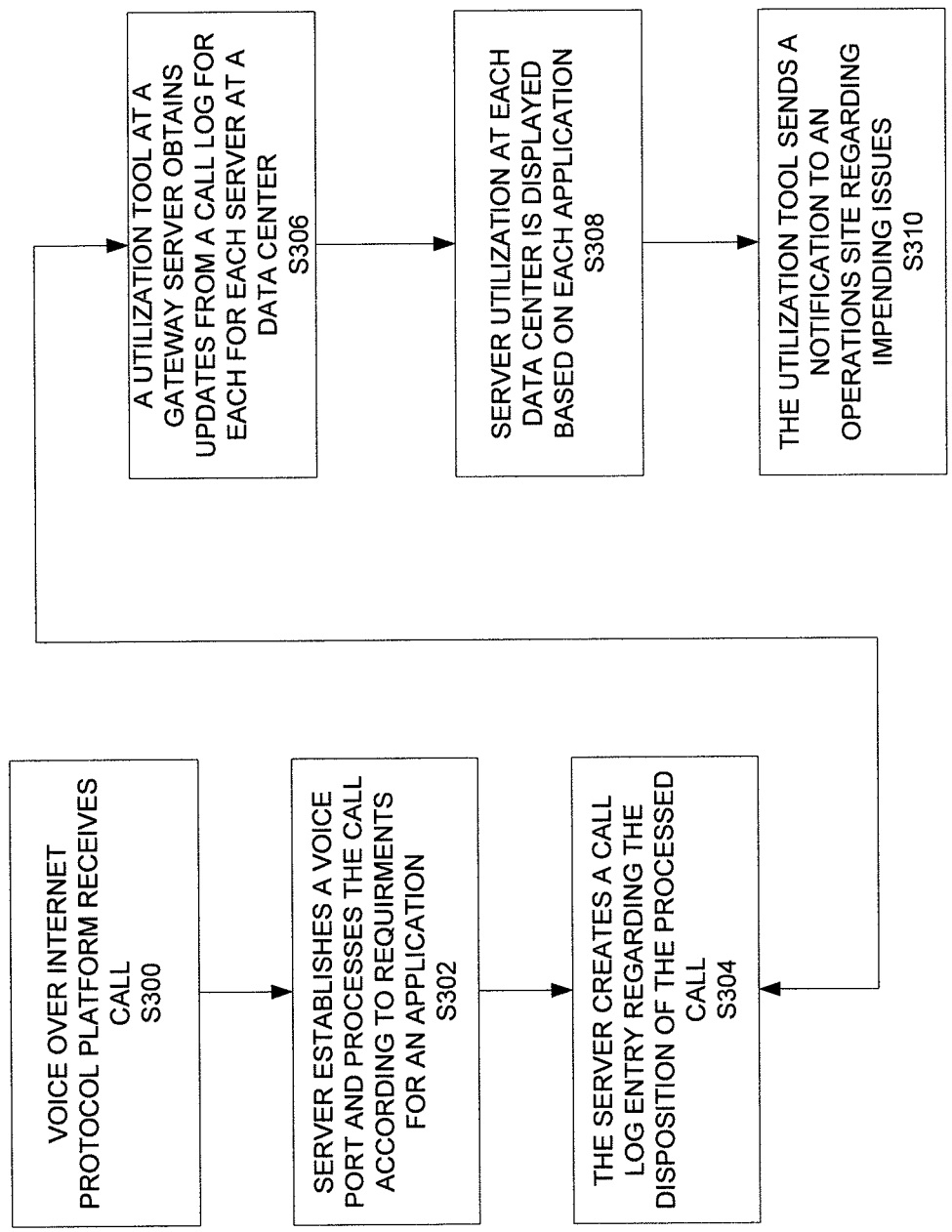
FIG. 3 illustrates a process flow diagram for determining and displaying utilization of voice ports in a voice over internet protocol platform, according to an aspect of the present disclosure.

In FIG. 3, at step S300, a voice over internet protocol platform receives a call at a site and a specified server and over a specified voice over internet protocol port. In step S302, the server processes the call according to the requirements for a client application with which the call is associated. For example, a tele-voting application may require that a server play three prerecorded messages and obtain a selection from the caller. The same server may also service calls for a customer service center, which may require the server to obtain a client identification number from the caller and retrieve a client file associated with the client identification number. The server creates a call log entry regarding the disposition of the processed call in step S304 and stores the call log entry in a call log, or metrics file on the server. The utilization tool obtains real-time updates from a call log for each server processing calls at a site in step S306. In step S308, server utilization at each load-balanced site is displayed. In one embodiment, server utilization is displayed based on each client application originating calls. That is, utilization per server is displayed by the client application requiring call processing operations to be performed by the server. In another embodiment, the display is a graphical user interface. In step S310 the utilization tool sends a notification to an operations site regarding impending issues.

The utilization tool displays, to a device able to access the gateway servers 220, 222, or a device able to receive display data from the gateway servers 220, 222, the number of voice over internet protocol ports being used by each server 208, 210, 212, 214, 216 and 218. The utilization tool updates a display of a number of voice over internet protocol ports being used at each server and each load-balanced site. The utilization tool dynamically updates the display of voice over internet protocol port utilization in real-time. As shown in FIG. 4A, voice over internet protocol port utilization data includes available ports, used ports, and percent usage by server, group and site. In one embodiment, the voice over internet protocol port utilization tool has automatic update capability with a one minute refresh frequency.

In FIG. 4B, voice over internet protocol port utilization is shown for each server in the voice over internet protocol platform, as utilized by each client application. That is, the number of voice ports allocated to each client application, the number of allocated voice ports in use by the server to process calls associated with each client application, and the percentage of voice ports in use by each client application, is shown.

Accordingly, the present invention enables a user to monitor the utilization of voice over internet protocol ports by receiving calls via voice ports established by servers, aggregating utilization information for each of the servers in accordance with applications associated with the calls, and separately displaying the aggregated utilization information for each of the applications, each of the applications corresponding to a distinct subset of the calls.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the utilization information displayed is used by a user to reconfigure the load-balancing of servers, groups or sites. In this example, the user is an operations administrator. If the utilization of a server is over 45%, as an example, calls will no longer be routed to the server. Rather, another server having a lower utilization, another group having a lower utilization, or another site having a lower utilization will receive the call. As shown in FIG. 4A, server 6 and server 7 located in group A of site 2, server 8 and server 9 located in group B of site 3 each have a utilization that is over the predetermined 45% threshold. An operations administrator may subsequently reconfigure load-balancing by routing traffic for sites 2 and 3 to site 1. Alternatively, traffic directed for servers 8 and 9 in group A may be redirected to server 10 in group B at site 3. As another alternative, traffic destined for server 6 in group A of site 2 may be rerouted to server 7. A load-balancing configuration may be reconfigured based on any configuration or grouping of servers in a voice over internet protocol platform. In addition, a group may be any grouping of servers at any number of sites based on a number of criteria chosen by an operations administrator or a system architect.

In another embodiment, the display is accessible by a user of the voice over internet protocol platform. In this example, the user is a caller using a mass calling application service. The caller may access the display and make calling decisions based on utilization information for the voice over internet protocol platform. For example, if the utilization of the voice over internet protocol platform is relatively low, then a caller may infer that a significant number of callers are not calling in to vote in a tele-voting application and may decide to place a call.

In yet another embodiment, a user may be the business department of a client application serviced by the voice over internet protocol platform. The user may use the display to determine whether another client application is monopolizing server or voice over internet protocol platform resources. The user may change business agreements based on the display of utilization information.

In still another embodiment, the display is a graphical user interface that is enabled to filter data to display requested items. A user of the display may enter input into a dialog box, drop-down menu, or other implementation of a selection tool selection criteria. For example, the user enters selection criteria including, but not limited to: servers having more than one thousand ports, all servers located at site 1, servers for which the utilization is over 40%, servers located at a specified geographic location, and servers for which over 500 ports are in use. It is noted that the selection criteria includes any information about the voice over internet protocol platform that is stored. One or more selection criteria may be entered by the user.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission as well as voice over Internet protocol represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for monitoring utilization of a voice over internet protocol platform in a mass calling application, comprising:

receiving telephony calls at load-balanced sites via voice ports established by a plurality of servers of the load-balanced sites that receive each of the calls over the Internet at an application layer port and that provide a plurality of interactive applications that interact with users in the calls to provide communications services, each of the calls being received at a specified server and over a voice over internet protocol port in the voice over internet protocol platform established by the specified server;

processing each of the calls according to requirements for one of the plurality of interactive applications with which each of the calls is associated;

obtaining a metrics file from each of the plurality of servers at predetermined intervals and parsing obtained metrics files;

creating a call log entry regarding a disposition of each of the received telephony calls and storing the call log entry in the metrics file on the specified server associated with each of the received telephony calls;

obtaining real-time updates for each of the plurality of servers;

aggregating, using a processor of a computer, utilization information of each of the plurality of servers for each of the plurality of interactive applications; and separately displaying the aggregated utilization information for each of the plurality of interactive applications, each of the plurality of interactive applications corresponding to a distinct subset of the calls, for prospective callers to make calling decisions based on the aggregated utilization information, wherein the utilization information is obtained in response to an alarm being raised by one of the plurality of servers, and wherein one of the plurality of interactive applications comprises a tele-voting application.

2. The method according to claim 1,
wherein a display of the aggregated utilization information is updated in real-time.

3. The method according to claim 1,
wherein the utilization information for one or more of the plurality of servers is calculated based on a number of voice ports handling calls.

4. The method according to claim 2,
wherein the display is displayed on a mobile device.

5. The method according to claim 1,
wherein a notification is sent to a device via one or more of: a text message, a webpage, an email and an automated telephone call, when the utilization information reaches a predetermined threshold.

6. The method according to claim 5,
wherein the predetermined threshold is distinct for each of the plurality of interactive applications.

7. The method according to claim 5,
wherein the predetermined threshold is customizable for each of the plurality of interactive applications.

8. The method according to claim 1, wherein the voice ports comprise logical communication channels.

9. The method according to claim 1, wherein the utilization information includes a display of a number of voice over internet protocol ports being used at each of a plurality of servers and each of a plurality of load balanced sites.

10. The method according to claim 1, wherein a display displays aggregated utilization information based upon user selected criteria from selectable options including servers having more than a specific number of ports, all servers located at a specific site, servers for which utilization is over a specific percentage, servers located at a specified geographic location, and servers for which a specific number of ports are in use.

11. A system for monitoring utilization of a voice over internet protocol platform in a mass calling application, comprising:

a plurality of servers each operable to receive telephony calls at load-balanced sites via voice ports established by each of the plurality of servers of the load-balanced sites that receive each of the calls over the Internet at an application layer port and that provide a plurality of interactive applications that interact with users in the calls to provide communications services, each of the calls being received at a specified server and over a voice over internet protocol port in the voice over internet protocol platform established by the specified server;

a processor to process each of the calls according to requirements for one of the plurality of interactive applications with which each of the calls is associated, obtain a metrics file from each of the plurality of servers at predetermined intervals and parsing obtained metrics files, create a call log entry regarding a disposition of each of the received telephony calls and storing the call log entry in the metrics file on the specified server associated with each of the received telephony calls, and obtain real-time updates for each of the plurality of servers;

an aggregator operable to aggregate utilization information of each of the plurality of servers for each of the plurality of interactive applications; and an outputter operable to display the aggregated utilization information for each of the plurality of interactive applications, each of the plurality of interactive applications corresponding to a distinct subset of the calls, for prospective callers to make calling decisions based on the aggregated utilization information, wherein the utilization information is obtained in response to an alarm being raised by one of the plurality of servers, and wherein the one of the plurality of interactive applications comprises a tele-voting application.

12. The system according to claim 11,
wherein the plurality of servers are located at a plurality of geographically distinct sites.

13. The system according to claim 12,
wherein a display displays aggregated utilization information for each of the plurality of geographically distinct sites.

14. The system according to claim 12,
wherein the plurality of geographically distinct sites are load-balanced based on the aggregated utilization information for each of the plurality of geographically distinct sites.

15. The system according to claim 11,
wherein calls are rerouted based on the aggregated utilization information for one or more of the plurality of servers.

16. A non-transitory tangible computer readable storage medium encoded with an executable computer program for monitoring utilization of a voice over internet protocol platform in a mass calling application and that when executed by a processor, causes the processor to perform operations comprising:

receiving telephony calls at load-balanced sites via voice ports established by each of a plurality of servers of the load-balanced sites that receive each of the calls over the Internet at an application layer port and that provide a plurality of interactive applications that interact with users in the calls to provide communications services, each of the calls being received at a specified server and over a voice over internet protocol port in the voice over internet protocol platform established by the specified server;

processing each of the calls according to requirements for one of the plurality of interactive applications with which each of the calls is associated;

obtaining a metrics file from each of the plurality of servers at predetermined intervals and parsing obtained metrics files;

creating a call log entry regarding a disposition of each of the received telephony calls and storing the call log entry in the metrics file on the specified server associated with each of the received telephony calls;

obtaining real-time updates for each of the plurality of servers;

aggregating utilization information of each of the plurality of servers for each of the plurality of interactive applications; and displaying the aggregated utilization information for each of the plurality of interactive applications, each of the plurality of interactive applications corresponding to a distinct subset of the calls, for prospective callers to make calling decisions based on the aggregated utilization information, wherein the utilization information is obtained in response to an alarm being raised by one of the plurality of servers, and wherein one of the plurality of interactive applications comprises a tele-voting application.

17. The non-transitory tangible computer readable storage medium according to claim 16,
wherein a display of the aggregated utilization information is searchable using a query tool.

18. The non-transitory tangible computer readable storage medium according to claim 17,
wherein parameters comprising one or more of: server identification, site identification, group identification are provided to the query tool to obtain utilization information for a subset of the plurality of servers.

19. The non-transitory tangible computer readable storage medium according to claim 18,
wherein a user of the display inputs a plurality of parameters to the query tool to obtain a filtered result.

* * * * *